United States Patent [19]

Sakamoto et al.

[11] Patent Number: 4,718,713
[45] Date of Patent: * Jan. 12, 1988

[54] FRONT STRUCTURE OF VEHICLE BODY

[75] Inventors: Toshinori Sakamoto; Osamu Matsuura, both of Hiroshima, Japan

[73] Assignee: Mazda Motor Corporation, Japan

[*] Notice: The portion of the term of this patent subsequent to Jan. 12, 2005 has been disclaimed.

[21] Appl. No.: 870,413

[22] Filed: Jun. 4, 1986

[30] Foreign Application Priority Data

Jun. 6, 1985 [JP] Japan ................... 60-123208

[51] Int. Cl.⁴ ................... B62D 25/08; B62D 25/14
[52] U.S. Cl. ................... 296/192; 296/84 A; 296/189
[58] Field of Search ............ 296/84 R, 84 A, 84 D, 296/189, 192, 193, 194, 29; 98/2.07, 2.08, 2.16, 2.17; 15/250.16, 250.19

[56] References Cited

U.S. PATENT DOCUMENTS

| 1,789,109 | 1/1931 | Moesta | 296/192 |
| 1,976,276 | 10/1934 | Aune | 98/2.08 |
| 3,421,174 | 1/1969 | Reese | 15/250.19 |
| 3,719,245 | 3/1973 | Wilfert | 296/84 R X |
| 4,283,085 | 8/1981 | Sacco et al. | 296/84 R |
| 4,406,343 | 9/1983 | Harasaki | 180/297 |
| 4,542,934 | 9/1985 | Komatsu et al. | 296/194 |
| 4,563,942 | 1/1986 | Grimm et al. | 98/2.07 X |
| 4,618,181 | 10/1986 | Tokuda et al. | 296/191 |
| 4,646,863 | 3/1987 | Yamada | 180/68.1 |

FOREIGN PATENT DOCUMENTS

| 961471 | 5/1950 | France | 296/84 R |
| 7767 | 1/1982 | Japan | 296/192 |
| 11174 | 1/1982 | Japan | 296/192 |
| 57-197369 | 8/1982 | Japan . | |
| 58-99109 | 7/1983 | Japan . | |
| 59-11976 | 1/1984 | Japan | 296/194 |

*Primary Examiner*—Dennis H. Pedder
*Attorney, Agent, or Firm*—Gerald J. Ferguson, Jr.; Michael P. Hoffman; Michael J. Foycik, Jr.

[57] ABSTRACT

An engine compartment is provided in front of a cowl box. The bottom and rear faces of the cowl box are defined by a dashboard upper panel. An upper member for supporting the windshield is connected to a flange provided on the upper edge of the dashboard upper panel. A lower member is connected to the upper member at a first end and to a wall of the dashboard upper panel at a second end to increase the rigidity of the windshield holding portion. The junction between the second end of the lower member with the wall of the dashboard upper panel being more fragile upon vehicular impact and resultant cowl box deformation than the connection of the dashboard upper panel upper edge flange and the upper member, allowing the upper member to remain engaged with the windshield. In an alternative embodiment, a junction of the dashboard upper panel and upper member is made most fragile.

8 Claims, 7 Drawing Figures

FRONT STRUCTURE OF VEHICLE BODY

BACKGROUND OF THE INVENTION

1. Field of the Invention

This invention relates to a front structure of a vehicle, and more particularly to a structure of a part of a vehicle body connected to a cowl box extending along the lower edge of the windshield.

2. Description of the Prior Art

Generally, a car, especially a passenger car, is provided with a cowl box along the lower edge of the windshield in order to introduce fresh air into the passenger compartment. As disclosed in Japanese Unexamined Utility Model Publication No. 58(1983)-99109, the cowl box typically has bottom and rear faces defined by a dashboard upper panel and a front face defined by a cowl front panel. The dashboard upper panel has a flange on the upper edge thereof and an upper member for holding the windshield is connected to the flange. Typically, to the upper member is connected an end of a lower member extending in the transverse direction of the vehicle body along the upper member, and the other end of the lower member is connected to a vertical wall of the dashboard upper panel so that the rigidity of the windshield holding portion is increased.

In a typical front-engine type vehicle, an engine compartment is generally formed in front of the cowl box. It has been pointed out that, in the conventional front structure of the vehicle body, in a collision the windshield is apt to become disengaged from the upper member. That is, when the engine in the engine compartment is forced rearward by a collision, pushing the dashboard upper panel to the rear, the upper member holding the windshield is moved rearward along with the dashboard upper panel, whereby the windshield is disengaged from the upper member and is broken. This is undesirable from the viewpoint of the safety of the occupants.

SUMMARY OF THE INVENTION

In view of the foregoing observations and description, the primary object of the present invention is to provide an improved front structure of a vehicle body having a cowl box in which the windshield is prevented from being disengaged from the upper member in a collision.

In accordance with the present invention, the bottom and rear faces of a cowl box are defined by a dashboard upper panel. An upper member for supporting the windshield is connected to a flange provided on the upper edge of the dashboard upper panel. A lower member is connected to the upper member at a first end and to a vertical wall of the dashboard upper panel at a second end to increase the rigidity of the windshield holding portion. The junction of the second end of the lower member with the vertical wall of the dashboard upper panel or the junction of the upper member with the flange of the dashboard upper panel is more fragile than the other junctions.

DESCRIPTION OF THE PREFERRED EMBODIMENTS

Figure 1:
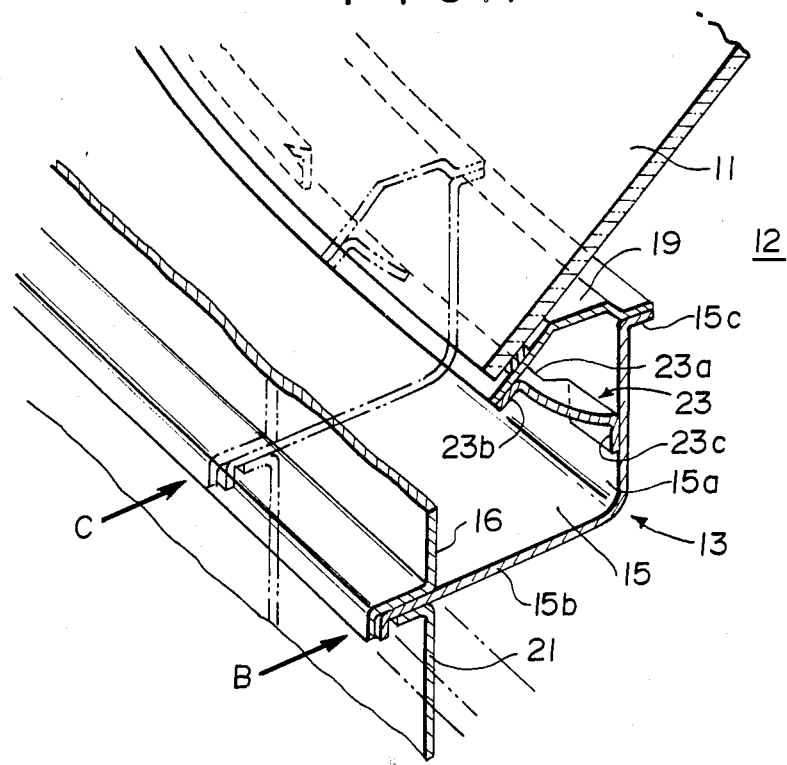
FIG. 1 is a fragmentary cross-sectional view showing a part of a front structure of a vehicle body in accordance with an embodiment of the present invention, the part corresponding to the part indicated by A in FIG. 4.
Figure 2:
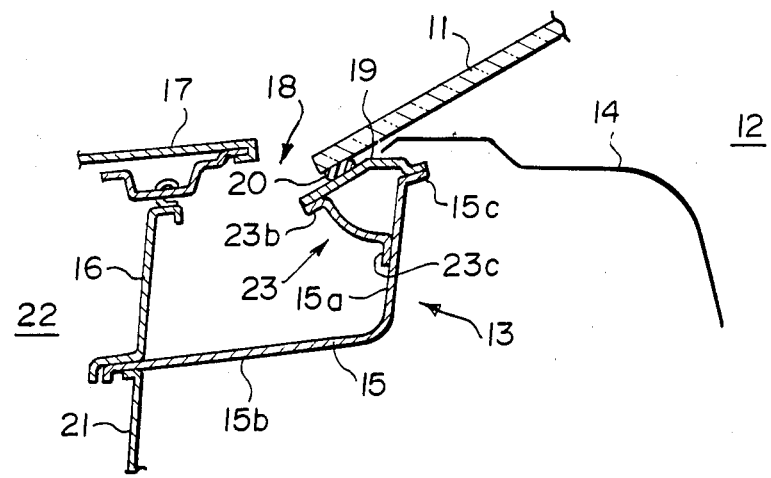
FIG. 2 is a fragmentary cross-sectional view showing part of the front structure of FIG. 1, the part corresponding to the part indicated by B in FIG. 1.
Figure 3:
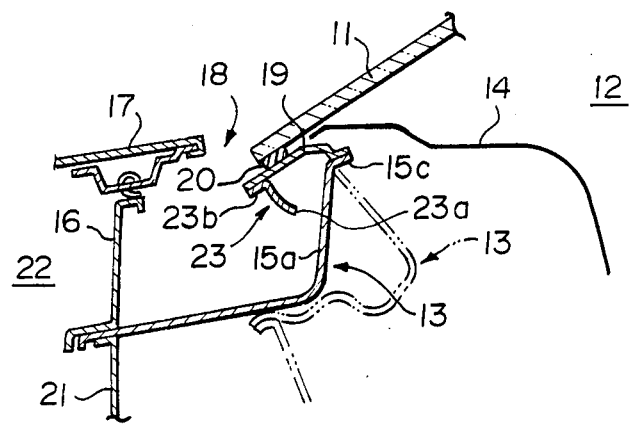
FIG. 3 is a fragmentary cross-sectional view showing part of the front structure of FIG. 1, the part corresponding to the part indicated by C in FIG. 1.

In FIGS. 1 to 3, a front structure of a vehicle in accordance with an embodiment of the present invention includes a cowl box 13 provided along the lower edge of a windshield 11. The cowl box 13 is disposed in front of an instrument panel 14 in a passenger compartment 12, and the bottom and rear faces of the cowl box 13 are defined by a dashboard upper panel 15. A cowl front panel 16 closes the front side of the cowl box 13. An engine compartment hood 17 is disposed above the cowl front panel 16. The upper side of the cowl box 13 opens (opening 18) to the outside between the rear edge of the hood 17 and the lower edge of the windshield 11 and fresh air is introduced into the cowl box 13 through the opening 18. The fresh air thus introduced into the cowl box 13 is fed to air conditioning equipment such as a blower, a cooler unit and the like.

The dashboard upper panel 15 comprises a vertical wall portion 15a defining the rear face of the cowl box 13 and a horizontal wall portion 15b defining the bottom face of the cowl box, and the upper edge portion of the vertical wall portion 15a is bent to form a flange portion 15c. To the flange 15c is connected, by spot welding, for instance, the rear edge portion of an upper member 19. The windshield 11 is supported on the upper member 19 and in this particular embodiment is fixed thereto by adhesive 20. A dashboard lower panel 21 is connected to the lower surface of a front edge portion of the dashboard upper panel 15. An engine compartment 22 in which an engine 24 is housed is formed in front of the dashboard lower panel 21 and the cowl front panel 16.

A first end 23b of a lower member 23 extending along the upper member 19 in the transverse direction of the vehicle body is connected by spot welding, for instance, to the lower surface of a front edge portion of the upper member 19. A second or other end 23c of the lower member 23 is connected by spot welding, for instance, to the vertical wall portion 15a of the dashboard upper panel 15. Thus, the lower member 23, the dashboard upper panel 15 and the upper member 19 together form a closed cross section which increases the rigidity of the portion holding the windshield 11.

Figure 5:
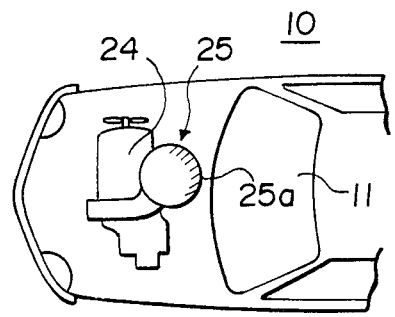
FIG. 5 is a fragmentary plan view of the vehicle body.

A cutaway portion 23a having a predetermined length is formed in the second end 23c of the lower member 23 at a portion near the middle thereof. That is, the second end 23c of the lower member 23 is spaced away from the vertical wall portion 15a of the dashboard upper panel 15 at the cutaway portion 23a. The cutaway portion 23a extends along a part corresponding to the rear surface 25a of an air cleaner 25 (FIG. 5) disposed on the rear side of the engine 24. At the part corresponding to the cutaway portion 23a, said closed cross section is not formed and accordingly the junction of the dashboard upper panel 15 and the upper member 19 at the part corresponding to the cutaway portion 23a is more fragile than the junction thereof at the other part, that is, the part at which the closed cross section is formed.

Figure 4:
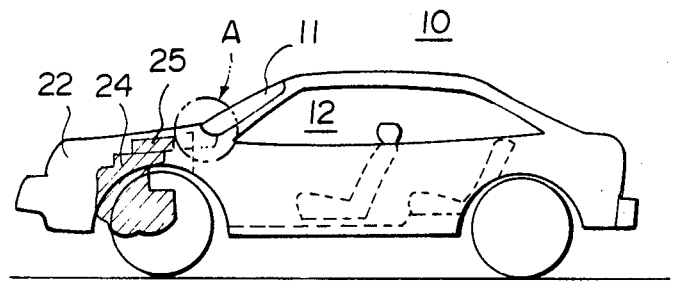
FIG. 4 is a schematic side view of a vehicle body in which the front structure of the present invention can be employed.

When the engine 24 is forced rearward in a collision, pushing to the rear the air cleaner 25 at the front portion of the vehicle body 10 (FIGS. 4 and 5), the pushing of the air cleaner 25 deforms the dashboard upper panel 15 and the dashboard lower panel 21 as shown by the chained line in FIG. 3. If the upper member 19 is firmly connected to the dashboard upper panel 15, the former is moved along with the latter and the windshield 11 can be disengaged from the upper member 19. However, in the front structure of this embodiment, since the junction of the dashboard upper panel 15 with the upper member 19 at the part which is pushed by the rear surface 25a of the air cleaner 25 is fragile, only the dashboard upper panel 15 is deformed and the upper member 19 can retain the normal condition it was in before the collision. Accordingly, the windshield 11 is prevented from being disengaged from the upper member 19.

In the embodiment described above, the air cleaner 15 projects rearward from the engine 24 and the rear surface 25a of the air cleaner 25 pushes the dashboard upper panel 15 rearward when the engine 24 is forced rearward by a collision. Accordingly, the dashboard upper panel 15 is connected with the upper member 19 fragilely at the part corresponding to the rear surface 25a of the air cleaner 25, that is, the cutaway portion 23a is formed to extend the part of the lower member 23 corresponding to the rear surface 25a of the air cleaner 25. When other auxiliary mechanisms are provided which project rearward from the engine 24, the dashboard upper panel 15 may be connected with the upper member 19 fragilely at the part corresponding to the rear surface of the auxiliary mechanism. Further, when there is no auxiliary mechanism projecting rearward from the engine 24 and the rear surface of the engine 24 will push against the dashboard upper panel 15 upon collision, the dashboard upper panel 15 may be connected with the upper member 19 at the part corresponding to the rear surface of the engine 24. If desired, the junction of the dashboard upper panel 15 with the upper member 19 may be made more fragile by forming a cutaway portion similar to the cutaway portion 23a in the first end 23b of the lower member.

Figure 6:
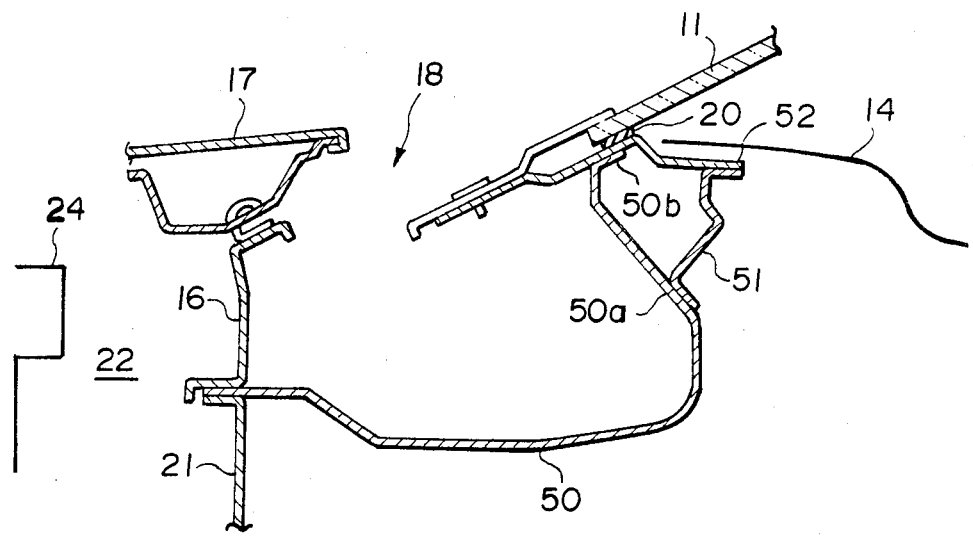
FIGS. 6 and 7 are fragmentary cross-sectional views respectively similar to FIGS. 2 and 3 but showing another embodiment of the present invention.
Figure 7:
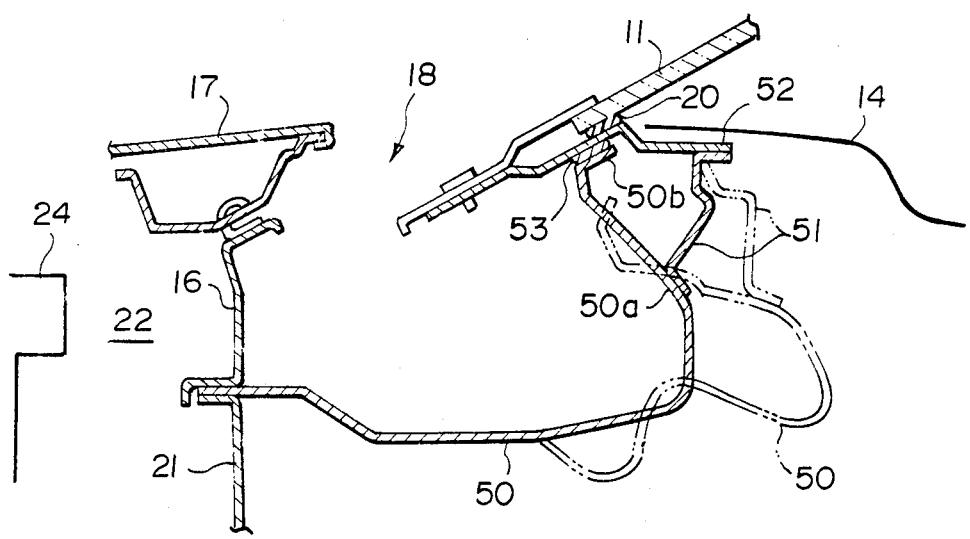

Another embodiment of the present invention will now be described with reference to FIGS. 6 and 7. In FIGS. 6 and 7, the parts corresponding to the parts shown in FIGS. 1 to 3 are given the same reference numerals and will no be described here. In this embodiment, the dashboard upper panel 50 has a vertical wall portion 50a that is inclined slightly forward. The lower member 51 is connected between the dashboard upper panel 50 and the upper member 52 on the rear side of the vertical wall portion 50a. The flange 50b on the upper edge of the dashboard upper panel 50 is connected to the upper member 52 that holds the windshield 11. The junction of the flange 50b with the upper member 52 is made by adhesive 53 at the part which will be pushed rearward in a collision by the engine or the mechanism projecting rearward from the engine (the part shown in FIG. 7) and by welding at the other part (the part shown in FIG. 6) so that the junction at the former part is more fragile than the junction at the latter part.

When the dashboard upper panel 50 is deformed rearward as shown by the chained line in FIG. 7, pushed by the engine 24 upon collision, the upper member 52 can retain the normal condition it was in before the collision, as in the embodiment described above, and accordingly the windshield 11 is prevented from being disengaged from the upper member 52. Similarly to the embodiment described above, the dashboard upper panel 50, the lower member 51 and the upper member 52 are welded together at said latter part to form a strong closed cross section, whereby the rigidity of the part holding the windshield 11 is enhanced.

We claim:

1. A front structure for a vehicle body having a cowl box extending along a lower edge of a windshield and an engine compartment formed in front of the cowl box characterized in that said cowl box has bottom and rear faces defined respectively by a horizontal wall portion and a vertical wall portion of a dashboard upper panel, and upper member for holding the windshield connected to a flange provided on an upper edge of the dashboard upper panel, and a lower member extending along the upper member in the transverse direction of the vehicle body and connected to the upper member at a first end and to the vertical wall portion of the dashboard upper panel at a second end by separable securement means a junction between the second end of the lower member and the vertical wall portion at said separable securement means being more fragile upon vehicular impact and resultant cowl box deformation than the connections of the upper member to both the lower member and the dashboard upper panel upper edge flange, allowing the upper member to remain engaged with the windshield.

2. A front structure as defined in claim 1 in which selected regions of the cowl box in the transverse direction exhibit increased fragility under impact.

3. A front structure as defined in claim 2 in which the increased fragility in the selected regions is achieved by a cutaway portion formed in a part of the second end of the lower member located rearwardly of a rear surface of the engine so that the second end of the lower member is spaced from the vertical wall portion of the dashboard upper panel.

4. A front structure as defined in claim 3 in which said first end of the lower member is connected to the lower surface of a front portion of the upper member and the second end of the lower member is connected to the vertical wall portion of the dashboard upper panel.

5. A front structure for a vehicle having a cowl box extending along a lower edge of a windshield and an engine compartment formed in front of the cowl box, the cowl box having bottom and rear faces defined respectively by a horizontal wall portion and an inclined wall portion of a dashboard upper panel, comprising: an upper member for holding the windshield which is connected to a flange provided on an upper edge of the dashboard upper panel and a lower member extending along the upper member connected at a first end to the upper member and to the inclined wall portion of the dashboard upper panel at a second end, a junction between the flange of the dashboard upper panel and the upper member being more fragile upon vehicular impact and resultant cowl box deformation than the connections of the lower member to both the upper member and the inclined wall portion, allowing the upper member to remain engaged with the windshield.

6. A front structure as defined in claim 5 in which a first portion of the junction between the flange of the dashboard upper panel and the upper member located rearwardly of a rear surface of an engine disposed in an engine compartment is more fragile than other portions of said junction.

7. A front structure as defined in claim 6 in which a portion of the junction between the flange of the dashboard upper panel and the upper member located rearwardly of the rear surface of the engine is made by adhesive while the other portions of said junction are made by welding, whereby the former is made more fragile than the latter.

8. A front structure as defined in claim 7 in which the lower member is connected to the dashboard upper panel and the upper member on a rear side of the inclined wall portion of the dashboard upper panel.

* * * * *